US011228176B2

(12) United States Patent
Kakuda et al.

(10) Patent No.: US 11,228,176 B2
(45) Date of Patent: Jan. 18, 2022

(54) POWER MANAGEMENT METHOD, LOCAL CONTROL APPARATUS AND POWER MANAGEMENT SYSTEM

(71) Applicant: KYOCERA Corporation, Kyoto (JP)

(72) Inventors: Yuji Kakuda, Yokohama (JP); Kenta Okino, Yokohama (JP); Naohisa Yoshitani, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 319 days.

(21) Appl. No.: 16/345,246

(22) PCT Filed: Oct. 31, 2017

(86) PCT No.: PCT/JP2017/039277
§ 371 (c)(1),
(2) Date: Apr. 26, 2019

(87) PCT Pub. No.: WO2018/079814
PCT Pub. Date: May 3, 2018

(65) Prior Publication Data
US 2019/0296549 A1 Sep. 26, 2019

(30) Foreign Application Priority Data
Oct. 31, 2016 (JP) ............... JP2016-212996

(51) Int. Cl.
*H02J 3/00* (2006.01)
*H02J 3/12* (2006.01)
(Continued)

(52) U.S. Cl.
CPC ............ *H02J 3/005* (2013.01); *G05B 15/02* (2013.01); *H02J 3/12* (2013.01); *H02J 3/32* (2013.01);
(Continued)

(58) Field of Classification Search
CPC ........ H02J 7/0022; H02J 7/0068; H02J 13/00; H02J 3/005; H02J 3/12; H02J 3/32;
(Continued)

(56) References Cited

U.S. PATENT DOCUMENTS 5,923,269 A 7/1999 Shuey et al.
7,715,951 B2 5/2010 Forbes, Jr. et al.
(Continued)

FOREIGN PATENT DOCUMENTS

JP 2005-102316 A 4/2005
JP 2008-294612 A 12/2008
(Continued)

*Primary Examiner* — Kidest Bahta
(74) *Attorney, Agent, or Firm* — Hauptman Ham, LLP

(57) ABSTRACT

A power management method comprises: a step A of transmitting a first message from a power management server to a local control apparatus according to a first protocol, the power management server managing a facility connected to a power grid, the local control apparatus provided in the facility; a step B of transmitting a second message from the local control apparatus to the equipment according to a second protocol different from the first protocol; and a step C of transmitting a third message from the local control apparatus to the power management server according to the first protocol, the third message including specification information specifying a local control element which the equipment is capable of dealing with according to the second protocol. The specification information includes information specifying whether or not the equipment deals with a local control element indicating an operation state requesting setting for the equipment.

7 Claims, 12 Drawing Sheets

(51) Int. Cl.
*H02J 3/32* (2006.01)
*H02J 3/38* (2006.01)
*H02J 13/00* (2006.01)
*G05B 15/02* (2006.01)

(52) U.S. Cl.
CPC ............... *H02J 3/38* (2013.01); *H02J 13/00* (2013.01); *Y02E 40/70* (2013.01); *Y04S 10/00* (2013.01); *Y04S 10/123* (2013.01)

(58) Field of Classification Search
CPC ....... H02J 3/38; G06Q 50/06; Y02B 70/3225; Y02B 70/30; Y02E 40/70; Y02E 10/56; Y02E 60/00; Y02E 70/30; Y04S 20/221; Y04S 10/00; Y04S 10/12; Y04S 10/123; Y04S 10/14; Y04S 20/222; H04L 51/18; H04L 69/18; B60L 55/00; G05B 15/02
See application file for complete search history.

(56) References Cited

U.S. PATENT DOCUMENTS

| | | | |
|---|---|---|---|
| 8,010,812 B2 | 8/2011 | Forbes, Jr. et al. | |
| 8,032,233 B2 | 10/2011 | Forbes, Jr. et al. | |
| 8,307,225 B2 | 11/2012 | Forbes, Jr. et al. | |
| 8,315,717 B2 | 11/2012 | Forbes, Jr. et al. | |
| 8,588,991 B1 | 11/2013 | Forbes, Jr. | |
| 2003/0197426 A1 | 10/2003 | Carson et al. | |
| 2006/0080380 A1 | 4/2006 | Aizu et al. | |
| 2007/0176789 A1 | 8/2007 | Kim | |
| 2010/0324962 A1* | 12/2010 | Nesler | G05B 17/02 705/7.36 |
| 2012/0016528 A1 | 1/2012 | Raman et al. | |
| 2012/0029717 A1 | 2/2012 | Cox et al. | |
| 2013/0085616 A1 | 4/2013 | Wenzel | |
| 2013/0090777 A1 | 4/2013 | Lu et al. | |
| 2013/0282196 A1 | 10/2013 | Tappeiner | |
| 2014/0148960 A1 | 5/2014 | Bhageria et al. | |
| 2014/0188296 A1 | 7/2014 | Oh et al. | |
| 2014/0317218 A1 | 10/2014 | Chiba | |
| 2015/0019036 A1 | 1/2015 | Murayama et al. | |
| 2015/0032278 A1 | 1/2015 | Bhageria et al. | |
| 2015/0200544 A1 | 7/2015 | Kitaji | |
| 2016/0056628 A1* | 2/2016 | Burstall | H02J 3/32 700/295 |
| 2016/0211665 A1 | 7/2016 | Maeda | |
| 2016/0286629 A1 | 9/2016 | Chen et al. | |
| 2016/0352114 A1 | 12/2016 | Kaji et al. | |
| 2018/0090987 A1* | 3/2018 | Hashimoto | G05B 15/02 |

FOREIGN PATENT DOCUMENTS

| | | |
|---|---|---|
| JP | 201020358 A | 1/2010 |
| JP | 2010537622 A | 12/2010 |
| JP | 2013-169104 A | 8/2013 |
| JP | 2014-128107 A | 7/2014 |
| JP | 2014-211737 A | 11/2014 |
| JP | 2015-119356 A | 6/2015 |
| JP | 2015-119389 A | 6/2015 |
| JP | 2015-195463 A | 11/2015 |
| JP | 2016-136297 A | 7/2016 |
| WO | 2012/144044 A1 | 10/2012 |

* cited by examiner

FIG. 11

| FIRST PROTOCOL | SECOND PROTOCOL |
|---|---|
| DISCHARGEABLE CAPACITY(Wh) | AC DISCHARGEABLE CAPACITY(Wh) |
| | RESIDUAL DC STORAGE AMOUNT(Wh) |
| | DRIVING OPERATION STATE |
| CHARGEABLE CAPACITY(Wh) | AC CHARGEABLE CAPACITY(Wh) |
| | RESIDUAL DC STORAGE AMOUNT(Wh) |
| | DC RATED CAPACITY(Wh) |
| | DRIVING OPERATION STATE |
| AC RATED CAPACITY(Wh) | DC RATED CAPACITY(Wh) |

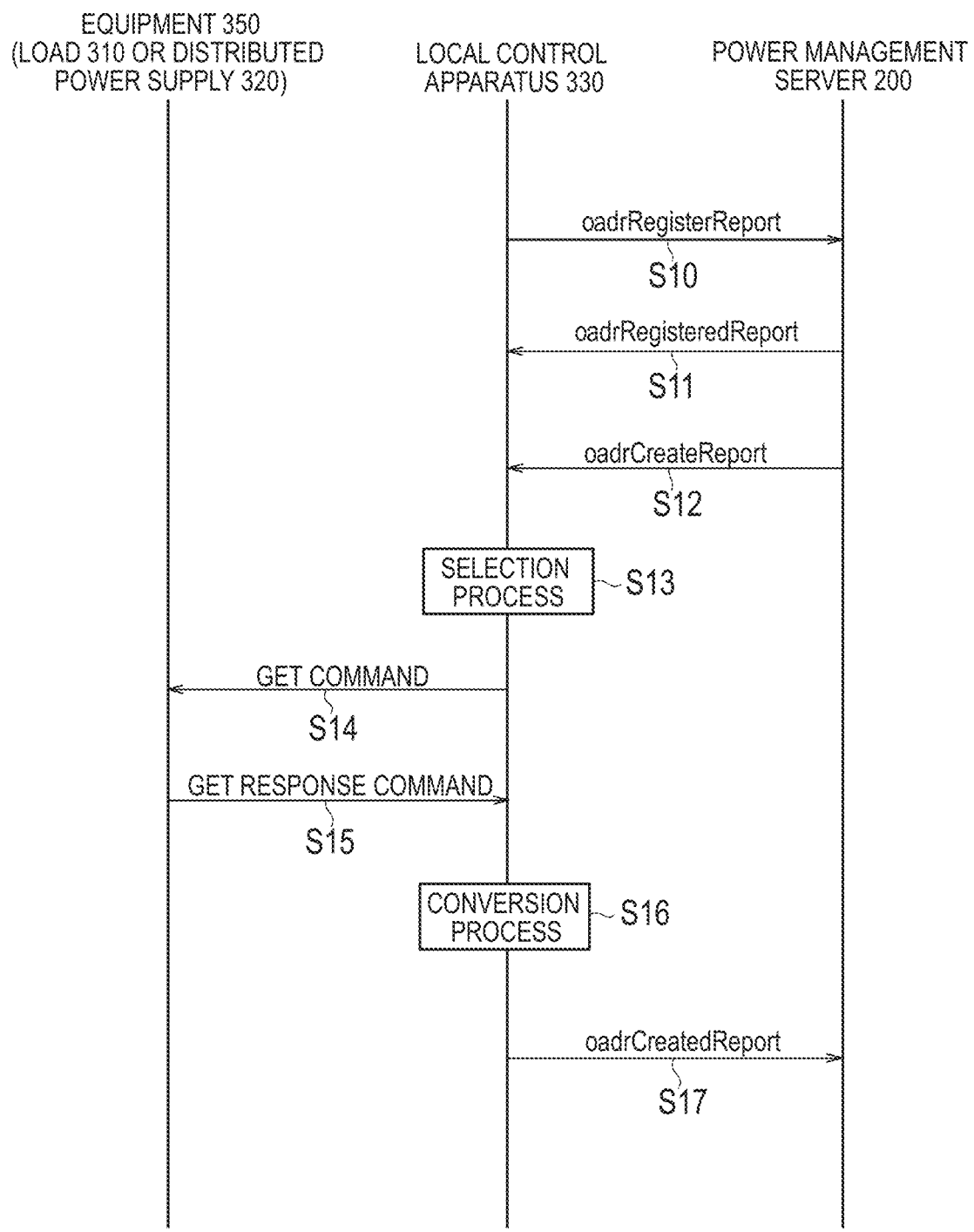

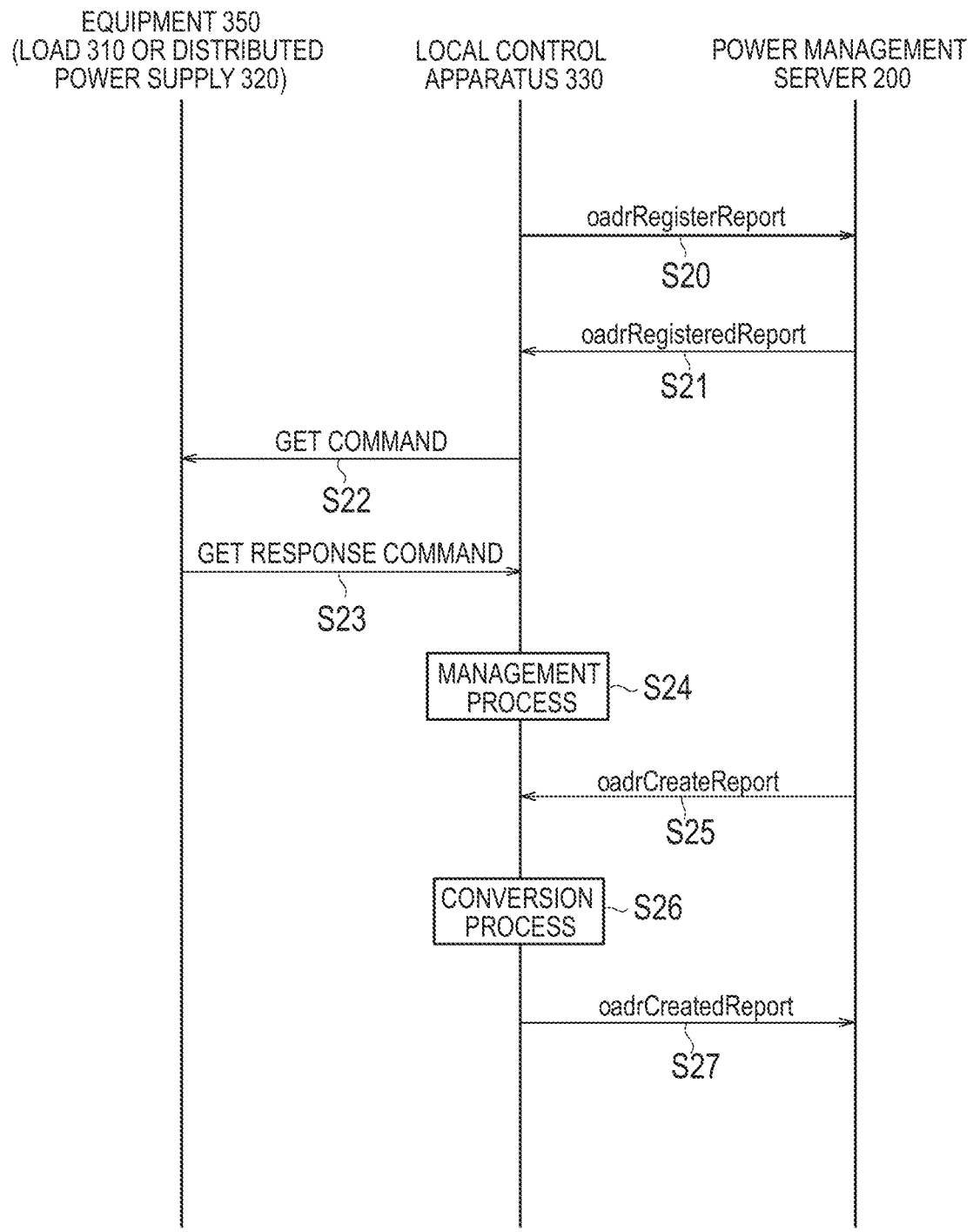

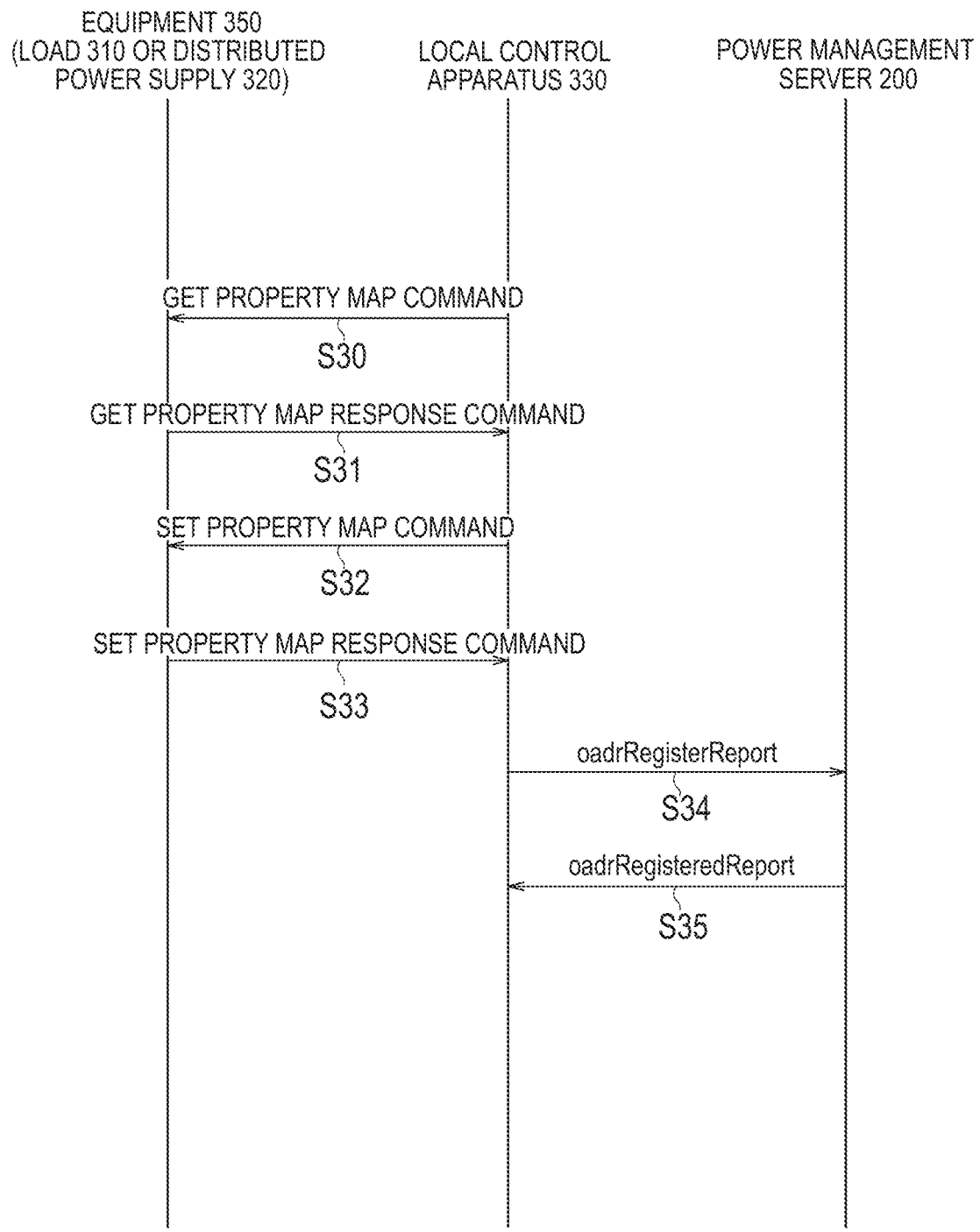

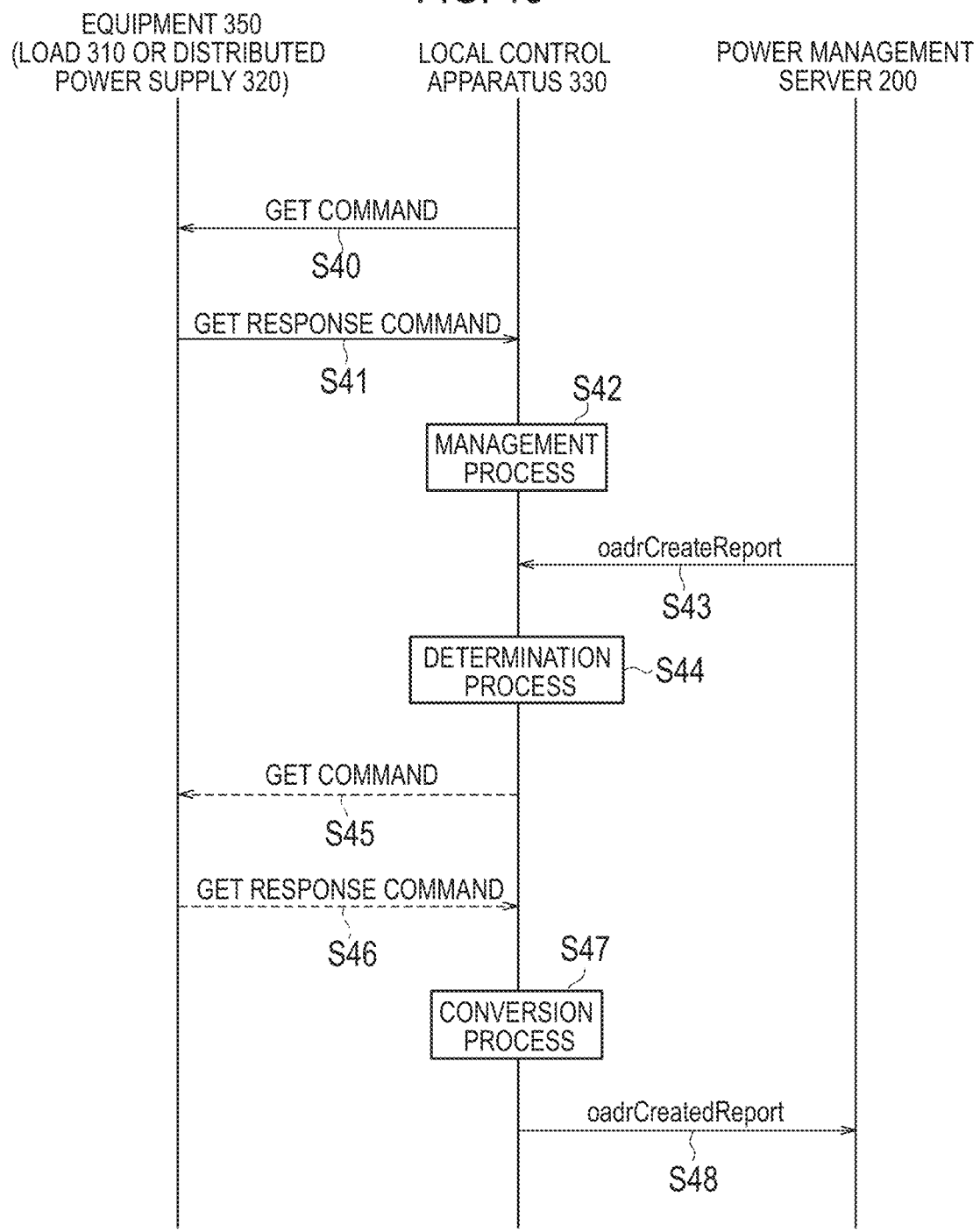

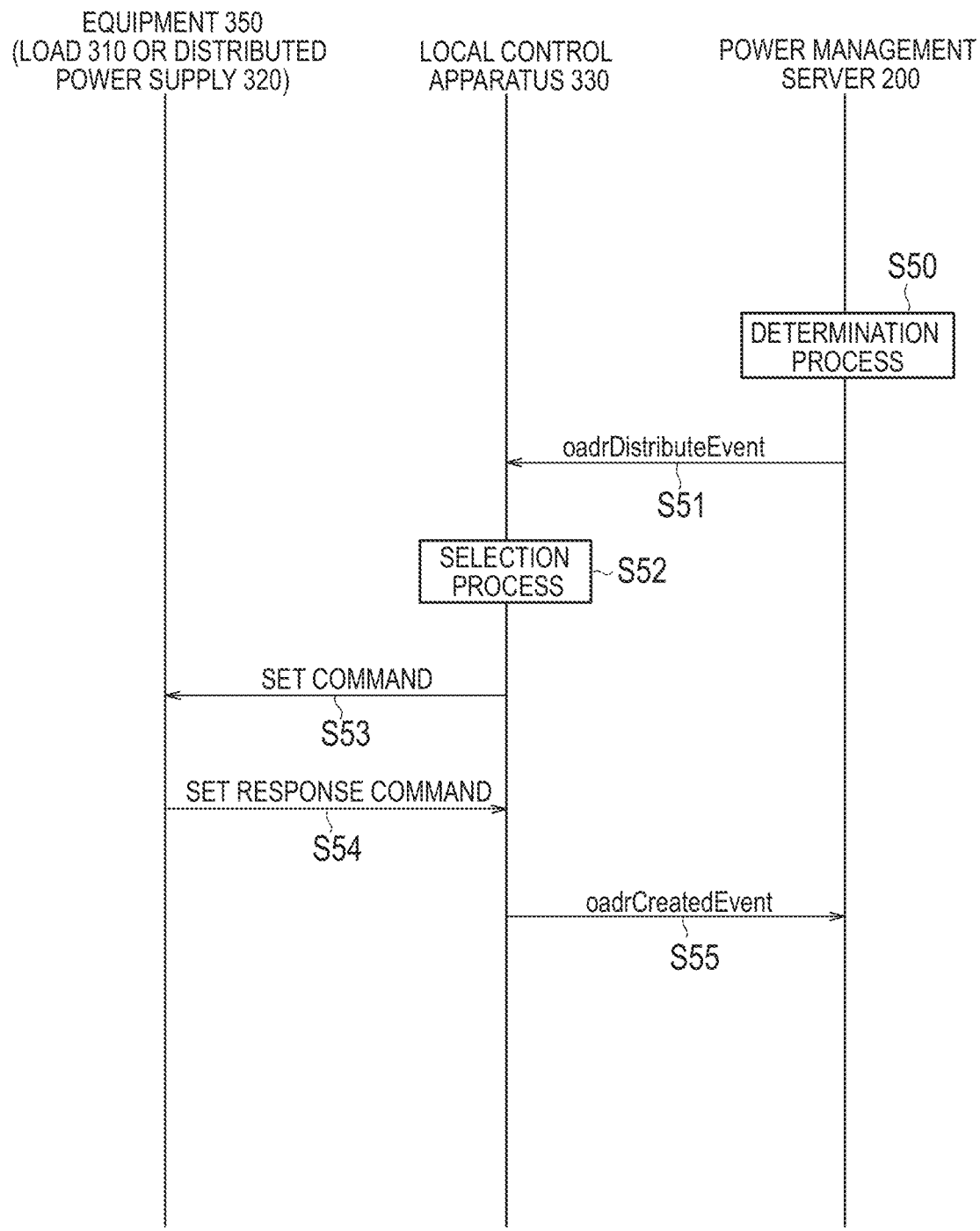

POWER MANAGEMENT METHOD, LOCAL CONTROL APPARATUS AND POWER MANAGEMENT SYSTEM

RELATED APPLICATIONS

The present application is a National Phase of International Application No. PCT/JP2017/039277, filed Oct. 31, 2017, and claims priority based on Japanese Patent Application No. 2016-212996, filed Oct. 31, 2016.

TECHNICAL FIELD

The present invention relates to a power management method, a local control apparatus and a power management system.

BACKGROUND ART

In recent years, in order to maintain a power supply and demand balance of a power grid, a technique for suppressing a power flow amount from the power grid to a facility or a reverse power flow amount from the facility to the power grid is known (for example, Patent Literatures 1 and 2). In addition, a system (hereinafter, referred to as Virtual Power Plant (VPP)) using distributed power supplies provided in a plurality of facilities as a power supply for supplying electric power to the power grid has attracted attention.

CITATION LIST

Patent Literature

Patent Literature 1: Japanese Application publication No. 2013-169104
Patent Literature 2: Japanese Application publication No. 2014-128107

SUMMARY OF INVENTION

A power management method according to a first aspect comprises: a step A of transmitting a first message from a power management server to a local control apparatus according to a first protocol, the power management server managing a facility connected to a power grid, the local control apparatus provided in the facility; a step B of transmitting a second message from the local control apparatus to the equipment according to a second protocol different from the first protocol; and a step C of transmitting a third message from the local control apparatus to the power management server according to the first protocol, the third message including specification information specifying a local control element which the equipment is capable of dealing with according to the second protocol. The specification information includes information specifying whether or not the equipment deals with a local control element indicating an operation state requesting setting for the equipment.

A local control apparatus according to a second aspect comprises: a receiver configured to receive a first message from a power management server according to a first protocol, the power management server managing a facility connected to a power grid; and a transmitter configured to transmit a second message to an equipment according to a second protocol different from the first protocol, the equipment provided in the facility. The transmitter is configured to transmit a third message to the power management server according to the first protocol, the third message including specification information specifying a local control element which the equipment is capable of dealing with according to the second protocol. The specification information includes information specifying whether or not the equipment deals with a local control element indicating an operation state requesting setting for the equipment.

A power management system according to a third aspect comprises: a power management server configured to manage a facility connected to a power grid; and a local control apparatus provided in the facility. The power management server includes a first transmitter configured to transmit a first message to the local control apparatus according to a first protocol. The local control apparatus includes a second transmitter configured to transmit a second message to an equipment provided in the facility according to a second protocol different from the first protocol. The second transmitter is configured to transmit a third message to the power management server according to the first protocol, the third message including specification information specifying a local control element which the equipment is capable of dealing with according to the second protocol. The specification information includes information specifying whether or not the equipment deals with a local control element indicating an operation state requesting setting for the equipment.

BRIEF DESCRIPTION OF DRAWINGS

FIG. 11 is a diagram illustrating an example of a correspondence relationship between a first protocol and a second protocol according to an embodiment.
FIG. 12 is a diagram illustrating a power management method according to an embodiment.
FIG. 13 is a diagram illustrating a power management method according to an embodiment.
FIG. 14 is a diagram illustrating a power management method according to a first modification.
FIG. 15 is a diagram illustrating a power management method according to a second modification.
FIG. 16 is a diagram illustrating a power management method according to a third modification.

DESCRIPTION OF EMBODIMENTS

Figure 1:
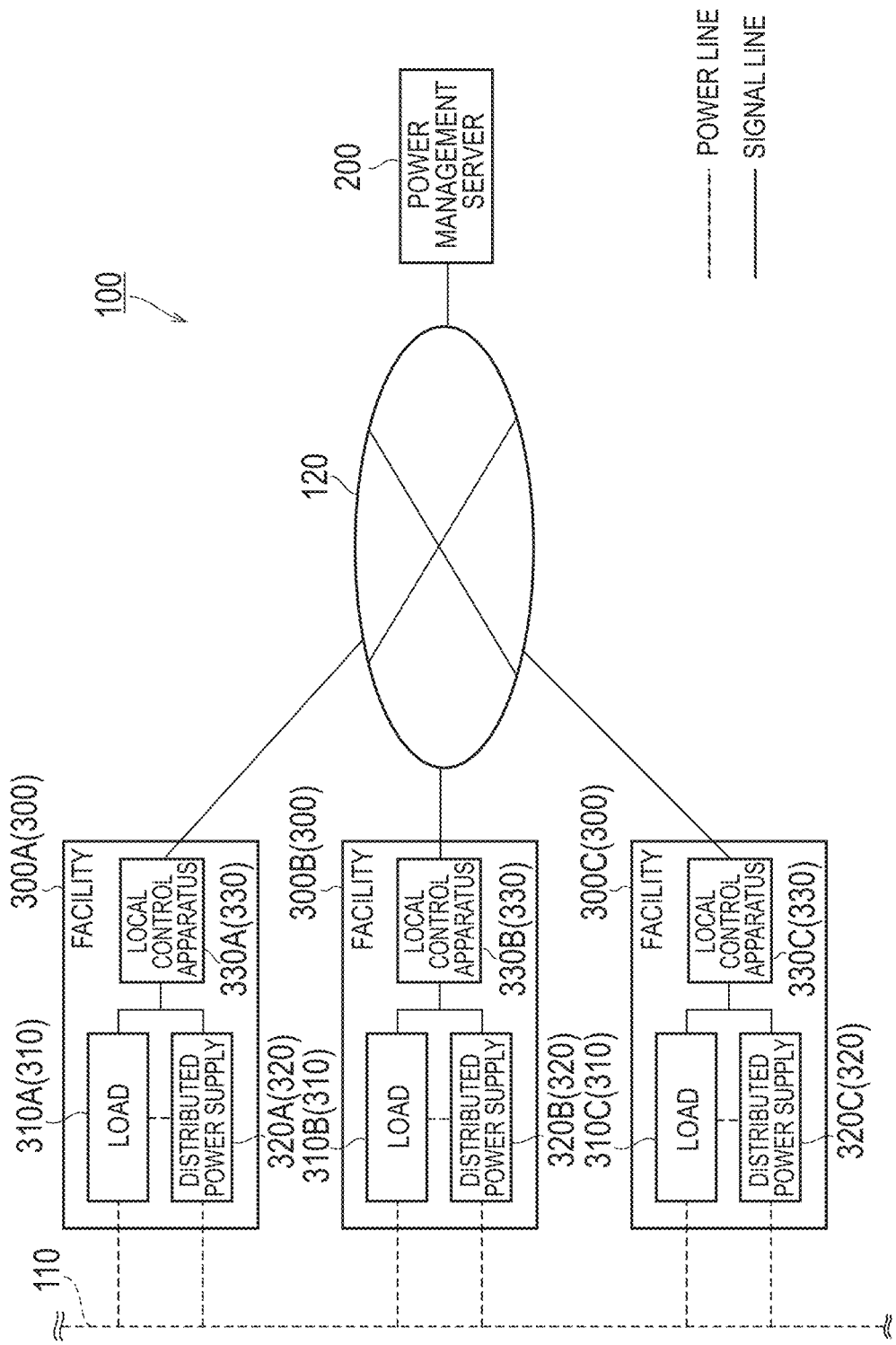
FIG. 1 is a diagram illustrating a power management system 100 according to an embodiment.

In the VPP, a power management server transmits a first message to a local control apparatus according to a first protocol, and the local control apparatus transmits a second message to an equipment according to a second protocol different from the first protocol. In such a case, various studies are needed to properly manage a power flow amount or a reverse power flow amount of a power grid.

A power management method, a local control apparatus and a power management system of an embodiment can appropriately manage a power flow amount or a reverse power flow amount of a power grid.

Hereinafter, embodiments will be described with reference to the drawings. In the following description of the drawings, the same or similar reference numerals are attached to the same or similar parts.

However, it should be noted that the drawings are schematic and ratios of dimensions and the like may be different from actual ones in some cases. Therefore, concrete dimensions and the like should be determined with reference to the following explanation. In addition, it is a matter of course that the drawings also include parts having different dimensional relationships or ratios between the drawings.

Embodiment (Power Management System)

Hereinafter, a power management system according to an embodiment will be described.

As illustrated in FIG. 1, a power management system 100 includes a power management server 200 and a facility 300. In FIG. 1, facilities 300 A to 300 C are exemplified as the facility 300.

Each facility 300 is connected to a power grid 110. Hereinafter, a flow of electric power from a power grid 110 to the facility 300 is referred to as a power flow, and a flow of electric power from the facility 300 to the power grid 110 is referred to as a reverse power flow.

The power management server 200 and the facility 300 are connected to a network 120. The network 120 may provide a line between a power management server 200 and a facility 300. The network 120 is, for example, the Internet. The network 120 may provide a dedicated line such as a Virtual Private Network (VPN).

The power management server 200 is a server managed by a business entity such as a power generation company, a transmission and distribution company or a retailer.

The power management server 200 instructs a local control apparatus 330 provided in the facility 300 to control an equipment (a load 310 or distributed power supply 320) provided in the facility 300. The control instruction for the equipment may be an instruction to request reporting of information on the equipment or an instruction requesting setting of an operation state of the equipment.

The instruction to request reporting of information on the equipment is performed by designating an information element indicating information on one or more equipments requested to reporting to the power management server 200. Such an information element include, for example, an amount of used electric power (Wh) of one or more loads 310, a history of the amount of used electric power (Wh) of one or more loads 310, a generated power (W) of the distributed power supply 320, a residual charge amount (Wh) of a storage battery, which is an example of the distributed power supply 320, charge/discharge electric power (W) of the storage battery, an amount of charge/discharge electric power (Wh) of the storage battery, a history of the amount of charge/discharge electric power (Wh) of the storage battery, chargeable and dischargeable amount (Wh) of the storage battery, a suppressible amount of a power flow amount (W), a suppressible amount of a reverse power flow amount (W), life-and-death information indicating whether or not the equipment is operating, an operating state of a Power Conditioning System (PCS) constituting the distributed power supply 320, and the like.

An instruction to request setting of the operation state of the equipment is performed by specifying an information element indicating the operation states of one or more equipments requested to set the equipment. Such an information element is constituted by an increase/decrease amount (Wh) of used electric power of the one or more loads 310, an increase/decrease amount (Wh) of the generated power of the distributed power supply 320, an increase/decrease amount (Wh) of the discharge power of the storage battery, and an increase/decrease amount (Wh) of the charge power of the storage battery.

Further, the power management server 200 may transmit a power flow control message (for example, Demand Response (DR)) requesting the control of the power flow as an instruction to request setting of the operation state of the equipment or may transmit a reverse power flow control message requesting the control of a reverse power flow. Further, the power management server 200 may transmit a power control message for controlling the operation state of the distributed power supply 320 as an instruction to request setting of the operation state of the equipment. A degree of control of the power flow or reverse power flow may be expressed as an absolute value (for example, ◯◯ kW) or may be expressed as a relative value (for example, ◯◯%). Alternatively, the degree of control of the power flow or the reverse power flow may be represented by two or more levels. The degree of control of the power flow or the reverse power flow may be represented by a power charge (RTP; Real Time Pricing) determined by a present power supply and demand balance and may be expressed by a power charge (TOU; Time Of Use) determined by the past power supply and demand balance.

The facility 300 has the load 310, the distributed power supply 320 and a local control apparatus 330. The load 310 is an equipment that consumes electric power. The load 310 may be, for example, an air conditioner or a lighting equipment. The distributed power supply 320 is the equipment having at least one of a function of outputting electric power and a function of accumulating the electric power. The distributed power supply 320 may be, for example, a solar cell, a fuel cell, or a storage battery. The distributed power supply 320 may be a power supply used for Virtual Power Plant (VPP). The local control apparatus 330 is an equipment (EMS; Energy Management System) that manages the power of the facility 300. The local control apparatus 330 may control the operation state of the load 310 and may control the operation state of the distributed power supply 320 provided in the facility 300.

In an embodiment, communication between the power management server 200 and the local control apparatus 330 is performed according to the first protocol. On the other hand, communication between the local control apparatus 330 and the equipment (the load 310 or the distributed power supply 320) is performed according to a second protocol different from the first protocol. As the first protocol, for example, a protocol conforming to Open Automated Demand Response (ADR) or an independent dedicated protocol may be used. As the second protocol, for example, a protocol conforming to ECHONET Lite, Smart Energy Profile (SEP) 2.0, KNX, or an independent dedicated protocol may be used. Incidentally, the first protocol and the second protocol may be different from each other, for example, both the protocols may be made with different rules even if they are independent dedicated protocols.

(Power Management Server)

Figure 2:
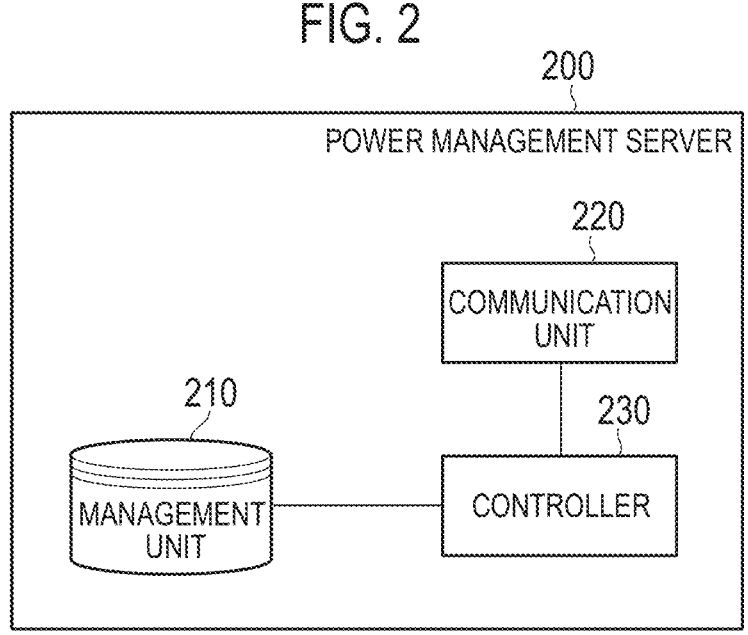
FIG. 2 is a diagram illustrating a power management server 200 according to an embodiment.

Hereinafter, the power management server according to the embodiment will be described. As illustrated in FIG. 2, the power management server 200 includes a management unit 210, a communication unit 220, and a controller 230. The power management server 200 is an example of a Virtual Top Node (VTN).

The management unit 210 is configured with a storage medium such as a nonvolatile memory and/or an HDD, and manages data on the facility 300. The data on the facility 300 is, for example, a type of the equipment (the load 310 or the distributed power supply 320) provided in the facility 300, a specification of the equipment (the load 310 or the distributed power supply 320) provided in the facility 300, and the like. The specification may be a rated power consumption of the load 310, a rated output power of the distributed power supply 320, or the like.

The communication unit 220 is constituted by a communication module and communicates with the local control apparatus 330 via the network 120. As described above, the communication unit 220 performs communication according to the first protocol. For example, the communication unit 220 transmits a first message to the local control apparatus 330 according to the first protocol. The communication unit 220 receives a first message response from the local control apparatus 330 according to the first protocol.

The controller 230 is constituted by a memory, a CPU, and the like, and controls each component provided in the power management server 200. For example, the controller 230 instructs the local control apparatus 330 provided in the facility 300 to control the equipment (the load 310 or the distributed power supply 320) provided in the facility 300.

(Local Control Apparatus)

Figure 3:
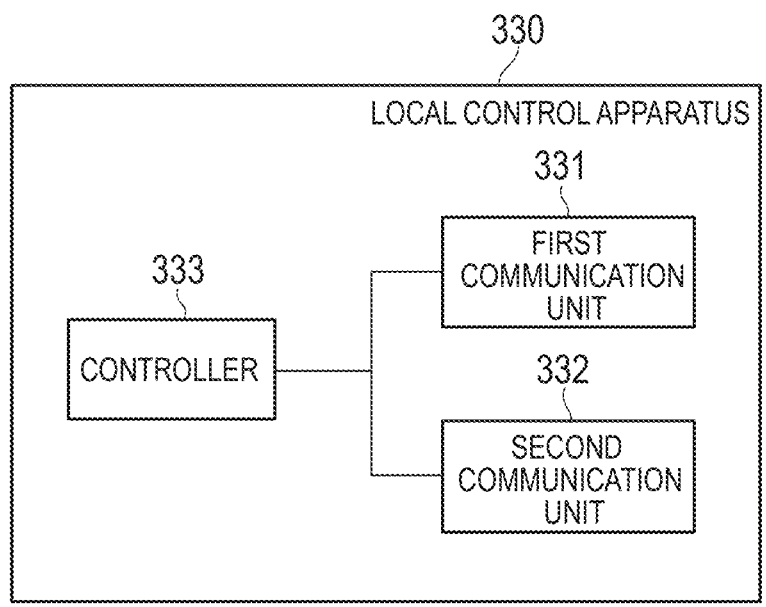
FIG. 3 is a diagram illustrating a local control apparatus 330 according to an embodiment.

Hereinafter, the local control apparatus according to the embodiment will be described. As illustrated in FIG. 3, the local control apparatus 330 includes a first communication unit 331, a second communication unit 332, and a controller 333. The local control apparatus 330 is an example of Virtual End Node (VEN).

The first communication unit 331 is configured by a communication module, and communicates with the power management server 200 via the network 120. As described above, the first communication unit 331 performs communication according to the first protocol. For example, the first communication unit 331 receives the first message from the power management server 200 according to the first protocol. The first communication unit 331 transmits the first message response to the power management server 200 according to the first protocol.

The second communication unit 332 is constituted by a communication module and communicates with the equipment (the load 310 or the distributed power supply 320). As described above, the second communication unit 332 performs communication according to the second protocol. For example, the second communication unit 332 transmits the second message to the equipment according to the second protocol. The second communication unit 332 receives the second message response from the equipment according to the second protocol.

The controller 333 includes a memory, a CPU, and the like, and controls each component provided in the local control apparatus 330. Specifically, in order to manage the power of the facility 300, the controller 333 instructs the equipment to report the information on the equipment by transmitting the second message and receiving the second message response. In order to control the power of the facility 300, the controller 333 instructs the equipment to set the operation state of the equipment by transmitting the second message.

In the embodiment, the controller 333 instructs the second communication unit 332 to transmit the second message including an information element of the second protocol corresponding to an information element of the first protocol, which corresponds to control content for the equipment instructed by the first message.

(1) A Case where the Control Content for the Equipment Instructed by the First Message is the Report of the Information on the Equipment In such a case, it is necessary to transmit a first message response including an information element complied with the first protocol to the power management server 200. Therefore, the controller 333 converts the information element included in the second message response into the information element complied with the first protocol. The conversion of the information element may be automatically performed by the local control apparatus 330 or may be performed through user's operation and approval. The controller 333 instructs the first communication unit 331 to transmit the first message response including the converted information element.

Here, the transmission of the second message and the reception of the second message response may be performed before receiving the first message. In such a case, the controller 333 instructs the first communication unit 331 to transmit the first message response on the basis of the information on the equipment managed by the controller 333 before receiving the first message. The information on the equipment managed by the controller 333 is information on the equipment obtained by the information element included in the second message response received from the equipment before receiving the first message.

Alternatively, the transmission of the second message and the reception of the second message response may be performed after receiving the first message. In such a case, the controller 333 selects an information element complied with the second protocol on the basis of the information element designated by the first message. The controller 333 instructs the second communication unit 332 to transmit the second message including the selected information element. The controller 333 instructs the first communication unit 331 to transmit the first message response on the basis of the information on the equipment managed by the controller 333 after receiving the second message response. The information on the equipment managed by the controller 333 is the information on the equipment obtained by the information element included in the second message response received from the equipment after receiving the first message.

Further, it is assumed that an information element complied with the first protocol does not correspond to an information element included in the second message response on a one-to-one basis. For example, a case where a unit of the information element complied with the first protocol is different from a unit of the information element included in the second message response may be considered. Alternatively, it is conceivable that an information element conforming to the first protocol can be expressed only by two or more information elements included in the second message response. In such a case, the controller 333 calculates an information element complied with the first protocol on the basis of the information element included in the second message response. For example, the controller 333 may calculate the information element represented by AC power on the basis of information elements represented by DC power. The controller 333 may calculate an information element represented by the electric power amount per unit time on the basis of the information element represented by the instantaneous power. The controller 333 may calculate one information element on the basis of two or more information elements.

(2) A Case where the Control Content for the Equipment Instructed by the First Message is the Setting of the Operation State of the Equipment In such a case, the local control apparatus 330 selects one or more information elements corresponding to the information elements specified by the first message from the information elements which the equipment is capable of dealing with in accordance with the second protocol. The local control apparatus 330 transmits a message including the selected information element to the equipment as a second message.

(Example of First Protocol)

An example of the first protocol according to the embodiment will be described below. Here, a case where the first protocol is a protocol conforming to Open ADR 2.0 is exemplified.

Figure 4:
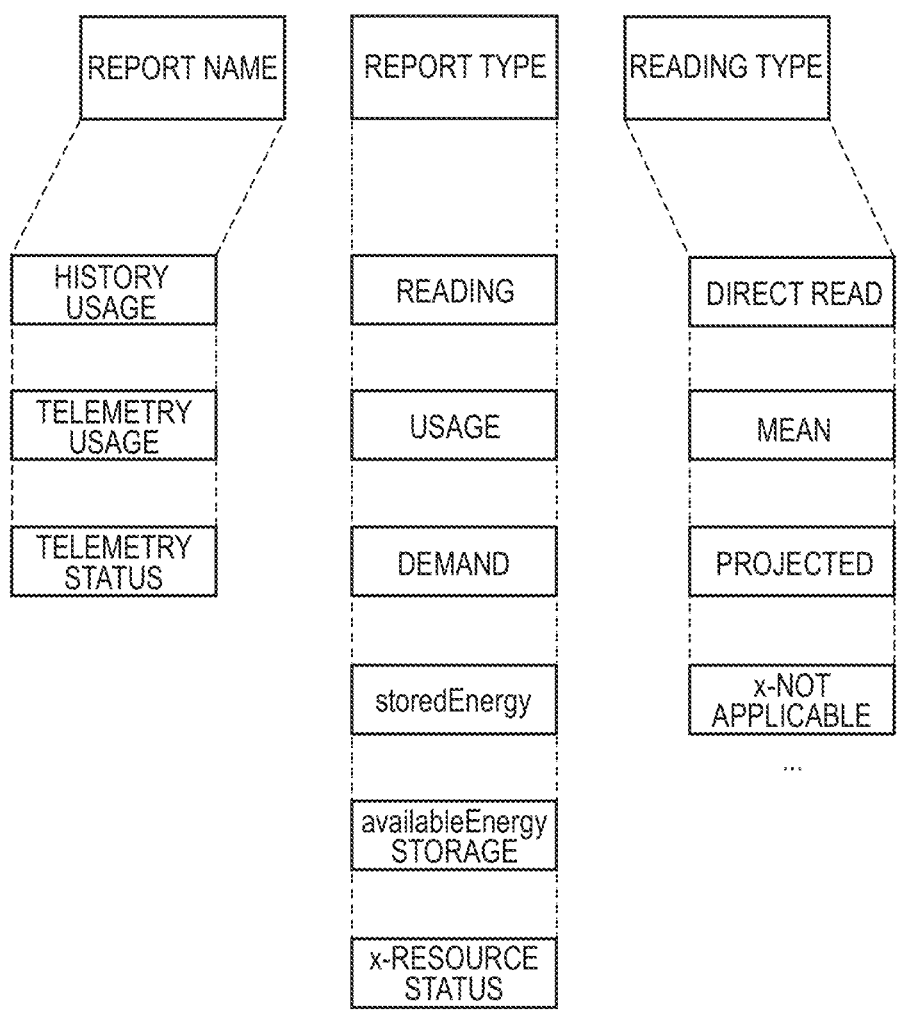
FIG. 4 is a diagram illustrating an example of a first protocol according to an embodiment.

As illustrated in FIG. 4, a reporting function of the information on the equipment is defined by "Report name," "Report type," "Reading type," and the like.

"Report name" is information indicating a name of the reporting. "Report name" is, for example, "HISTORY_USAGE," "TELEMETRY_USAGE," and "TELEMETRY_STATUS," and the like. "HISTORY_USAGE" means a report on measurement data (for example, used electric power, generated electric power or the like) of the equipment in the past. "TELEMETRY_USAGE" means a report on measurement data (for example, used electric power, generated electric power or the like) of the equipment in the present time. "TELEMETRY_STATUS" means a report on the operation state of the equipment in the present time.

"Report type" is information indicating a type of the report. "Report type" is, for example, "reading," "usage," "demand," "storedEnergy," "availableEnergyStorage," "x-resourceStatus," and the like. The information "reading" means a report on a measurement value of a meter provided in the facility 300. The information "usage" means a report on the amount of power used over a certain period of time. The information "demand" means a report on demand for electric power over a certain period of time. The information "storedEnergy" means a report on a storage amount of the storage battery in the present time. The information "availableEnergyStorage" means a report on a storageable amount of the storage battery in the present time. The information "x-resourceStatus" means a report on the user-definable information element (operating state of the equipment).

"Reading type" is information indicating a reporting method. "Reading type" is, for example, "Direct read," "Mean," "Projected," "x-notAplicable," and the like. "Direct read" means a report on a measurement value obtained directly from the equipment. "Mean" means a report on an average value of the measured values over a certain period of time. "Projected" means a report on a predicted value in the future. The information "x-notAplicable" means a report on user-definable information elements.

Here, a list of reporting functions which the local control apparatus 330 is capable of dealing with is included in, for example, a message (for example, oadrRegisterReport) transmitted from the local control apparatus 330 to the power management server 200. A first message (for example, oadrRegisteredReport or oadrCreateReport) that requests reporting of the information on the equipment is transmitted on the basis of the list of reporting functions. Specifically, identification information (report specifier ID) is allocated to the report function which the local control apparatus 330 is capable of dealing with, and the first message requesting the report of the information on the equipment includes such identification information.

Figure 5:
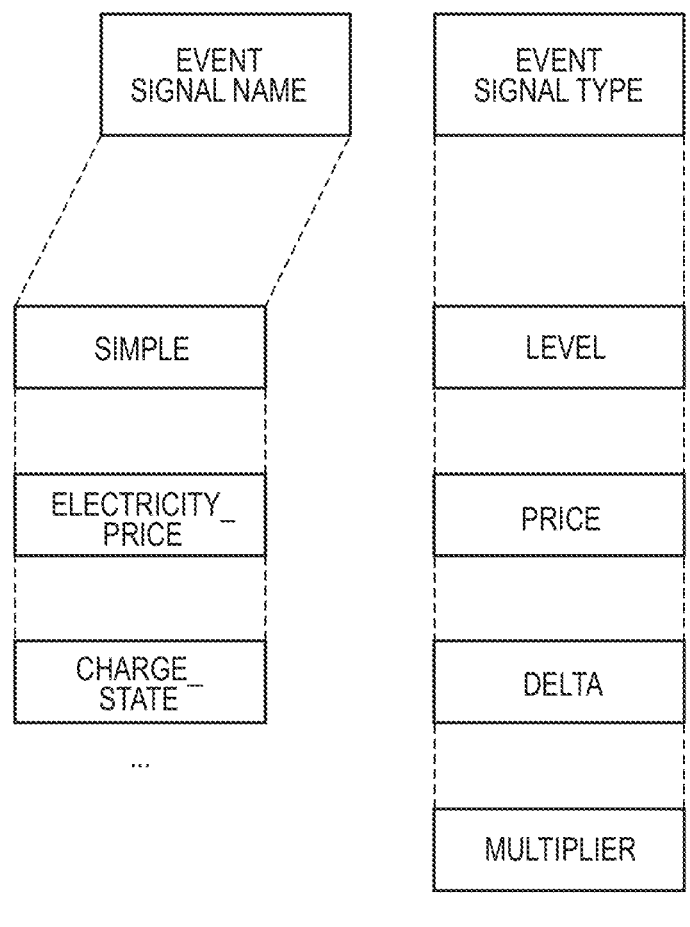
FIG. 5 is a diagram illustrating an example of a first protocol according to an embodiment.

As illustrated in FIG. 5, the setting function of the operation state of the equipment is defined by "Event signal Name," "Event signal Type," and the like.

"Event signal Name" is information indicating a name of the setting. "Event signal Name" is, for example, "SIMPLE," "ELECTRICITY_PRICE," "CHARGE_STATE," and the like.

"SIMPLE" means setting related to a level of the power flow amount or the reverse power flow amount. "SIMPLE" is simply expressed, for example, by numerical values such as "0," "1," "2," and the like. "SIMPLE" is information for indirectly controlling the operation state of the equipment according to the level of the power flow amount or the reverse power flow amount. "ELECTRICITY_PRICE" means a setting related to a power charge (power purchase charge or power sale charge). "ELECTRICITY_PRICE" is information for indirectly controlling the operation state of the equipment by the power charge and adjusting the power flow amount or the reverse power flow amount. "CHARGE_STATE" means setting relating to discharging or charging of the storage battery. "CHARGE_STATE" is information for specifying the setting of the operation state of the storage battery.

"Event signal Type" is information indicating the type of setting. "Event signal Type" is, for example, "level," "price," "delta," "multiplier" and the like. The information "level" means adjusting the power flow amount or the reverse power flow amount by designating a level of the amount. The information "price" means adjusting the power flow amount or the reverse power flow amount according to the designation of the power charge. The information "delta" means adjusting the power flow amount or the reverse power flow amount by specifying an absolute value of a variation amount of the operation state (consumed power, generated power, discharged power, stored power, and the like) of the equipment. The information "multiplier" means adjusting the power flow amount or the reverse power flow amount by specifying a relative value of the variation amount of the operation state (consumed power, generated power, discharged power, stored power, and the like) of the equipment.

The first message (for example, oadrDistributeEvent) requesting setting of the operation state of the equipment includes information indicating "Event signal Name," "Event signal Type", and the like.

(Example of Second Protocol)

Hereinafter, an example of the second protocol according to the embodiment will be described. Here, a case where the second protocol is a protocol conforming to ECHONET Lite will be exemplified.

Figure 6:
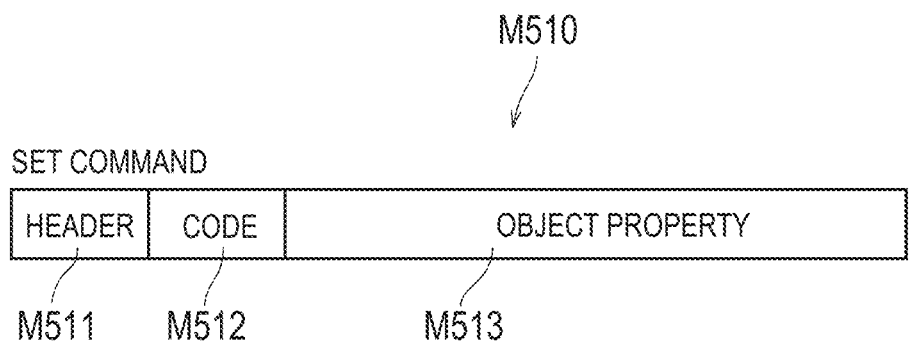
FIG. 6 is a diagram illustrating an example of a second protocol according to an embodiment.

As illustrated in FIG. 6, the second message (hereinafter referred to as SET command M510) requesting setting of the operation state of the equipment includes a header M511, a code M512, and a target property M513. In the embodiment, the SET command M510 is an example of a setting command that instructs each equipment to perform setting or operation of the equipment, and is a command transmitted from the EMS 160 to the equipment. The header M511 is information indicating a destination and the like of the SET command M510. The code M512 is information indicating a type of the message including the code M512. Here, the code M512 is information indicating that the message including the code M512 is a SET command. The target property M513 includes an information element (property) indicating the setting or the operation that the EMS 160 instructs the equipment to perform.

Figure 7:
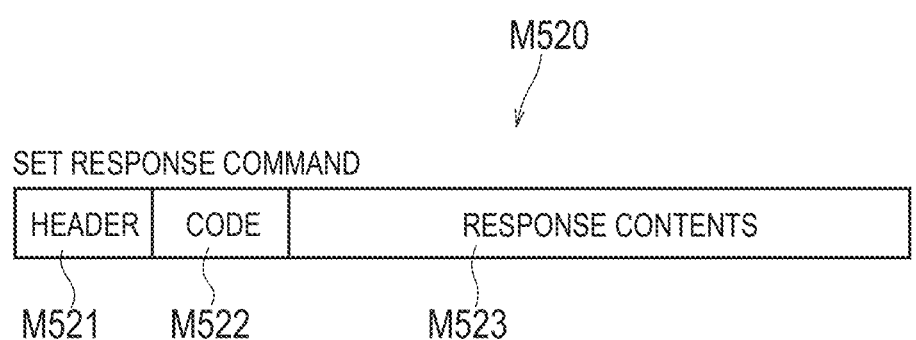
FIG. 7 is a diagram illustrating an example of a second protocol according to an embodiment.

As illustrated in FIG. 7, the second message response (hereinafter, SET response command M520) to the second message includes a header M521, a code M522, and a response content M523. In the embodiment, the SET response command M520 is an example of a command transmitted from the equipment to the EMS 160 in response to a command received from the EMS 160.

The header M521 is information indicating a destination and the like of the SET response command M520. The code M522 is information indicating a type of the message including the code M522. Here, the code M522 is information indicating that the message including the code M522 is a SET response command. The response content M523 includes information indicating that the SET command has been received. Such information may be a copy of a property included in the SET command or an acknowledgment (ACK). Further, such information is not limited thereto, and may be a response (Selective ACK) intended to inform that only a part of data is correctly received.

Figure 8:
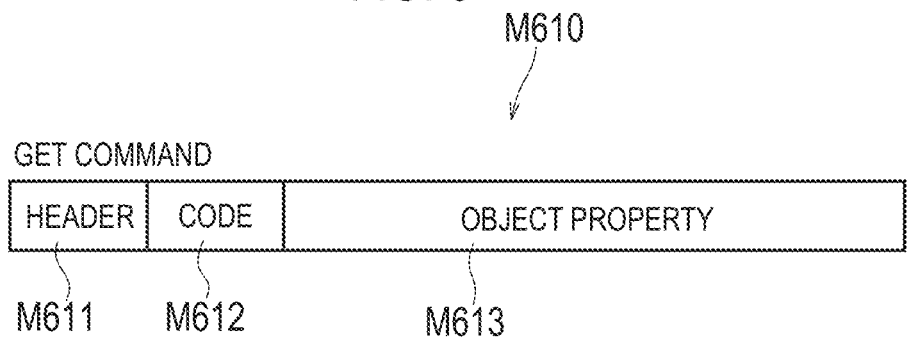
FIG. 8 is a diagram illustrating an example of a second protocol according to an embodiment.

As illustrated in FIG. 8, a second message (hereinafter, referred to as GET command M610) requesting a report of the information on the equipment includes a header M611, a code M612, and a target property M613. In the embodiment, the GET command M610 is an example of a request command for requesting a report of the information on the equipment for each equipment, and is an example of a command transmitted from the EMS160 to the equipment. The header M611 is information indicating a destination and the like of the GET command M610. The code M612 is information indicating a type of the message including the code M612. Here, the code M612 is information indicating that the message including the code M612 is a GET command. The target property M613 includes an information element (property) whose report is requested by the EMS 160.

Figure 9:
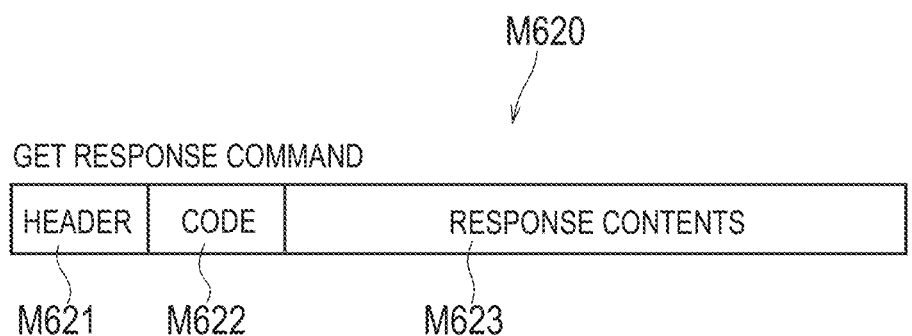
FIG. 9 is a diagram illustrating an example of a second protocol according to an embodiment.

As illustrated in FIG. 9, the second message response to the second message (hereinafter, GET response command M620) includes a header M621, a code M622, and a response content M623. In the embodiment, the GET response command M620 is an example of a command transmitted from the equipment to the EMS 160 in response to a command received from the EMS 160.

The header M621 is information indicating a destination and the like of the GET response command M620. The code M622 is information indicating a type of the message including the code M622. Here, the code M622 is information indicating that the message including the code M622 is a GET response command. The response content M623 includes the information element (property) requested by the GET command.

Figure 10:
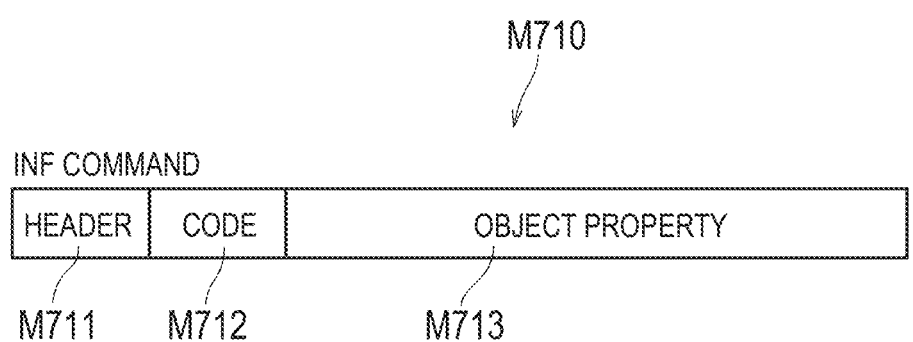
FIG. 10 is a diagram illustrating an example of a second protocol according to an embodiment.

As illustrated in FIG. 10, the INF command M710 includes a header M711, a code M712, and a target property M713. In the embodiment, the INF command M710 is an example of an information notification command autonomously notifying the information on the equipment from each equipment, and is an example of a command transmitted from each equipment to the EMS 160. The header M711 is information indicating a destination and the like of the INF command M710. The code M712 is information indicating a type of the message including the code M712. Here, the code M712 is information indicating that the message including the code M712 is an INF command. The target property M713 includes an information element (property) autonomously notified from each equipment.

Here, the information element (property) may be shared between commands. For example, in the case where the information element is the operation state of the equipment, the SET command including the operation state as the information element functions as a command instructing the equipment to set the operation state. On the other hand, the GET command including the operation state as the information element functions as a command requesting a report of the operation state of the equipment.

As the information element (property), an information element used only for the SET command (SET response command), an information elements used only for the GET command (GET response command), an information elements used only for the INF command, and Information element used for two or more commands selected from the SET command (SET response command), the GET command (GET response command) and the INF command are listed.

(Correspondence Between First Protocol and Second Protocol)

Hereinafter, a correspondence between the first protocol and the second protocol according to the embodiment will be described. Here, a storage battery will be described as an example of the equipment.

As illustrated in FIG. 11, the information element defined in the first protocol may correspond to one or more information elements defined in the second protocol. However, the equipment does not necessarily deal with all of the information elements defined in the second protocol.

First, a dischargeable capacity defined in the first protocol corresponds to an AC dischargeable capacity defined in the second protocol. However, in the case where the equipment cannot cope with the AC dischargeable capacity, the dischargeable capacity defined in the first protocol may only correspond to a residual DC storage amount and a DC rated capacity defined in the second protocol. As the case where the equipment cannot cope with the AC dischargeable capacity, a case where the information element corresponding to the AC dischargeable capacity is not defined in the second protocol or a case where the information element corresponding to the AC dischargeable capacity is defined as an option in the second protocol but the equipment does not deal with the option, is conceivable.

Therefore, the local control apparatus 330 calculates the dischargeable capacity on the basis of the residual DC storage amount. Specifically, the local control apparatus 330 regards the residual DC storage amount as a DC dischargeable capacity and calculates the AC dischargeable capacity on the basis of the DC dischargeable capacity.

Further, the local control apparatus 330 may calculate the AC dischargeable capacity on the basis of driving operation state (for example, rapid charge, charge, discharge, standby, test, automation, restart, and the like). For example, the local control apparatus 330 may calculate zero as the AC dischargeable capacity when the driving operation state is not the discharge.

Second, a chargeable capacity defined in the first protocol corresponds to an AC chargeable capacity defined in the second protocol. However, in the case where the equipment cannot cope with the AC chargeable capacity, the chargeable capacity defined in the first protocol may only correspond to the residual DC storage amount and the DC rated capacity defined in the second protocol.

Therefore, the local control apparatus 330 calculates the chargeable capacity on the basis of the residual DC storage amount and the DC rated capacity. Specifically, the local control apparatus 330 calculates the DC chargeable capacity by subtracting the residual DC storage amount from the DC rated capacity, and calculates the AC chargeable capacity on the basis of the DC chargeable capacity.

Further, the local control apparatus 330 may calculate the AC chargeable capacity on the basis of the driving operation state (for example, rapid charge, charge, discharge, standby, test, automation, restart, and the like). For example, the local control apparatus 330 may calculate zero as the AC chargeable capacity in the case where the driving operation state is not the charge.

Third, since the AC rated capacity defined in the first protocol is not defined in the second protocol, it may only correspond to the DC rated capacity. Therefore, the local control apparatus 330 calculates the AC rated capacity on the basis of the DC rated capacity.

In this manner, the local control apparatus 330 may calculate the information element represented by the AC power on the basis of the information element represented by the DC power. The local control apparatus 330 may calculate one information element on the basis of two or more information elements.

(Power Management Method)

Hereinafter, the power management method according to the embodiment will be described. In the following, a case will be exemplified where the first protocol is a protocol conforming to Open ADR 2.0, and the second protocol is a protocol conforming to ECHONET Lite. Further, a sequence relating to reporting the information on the equipment will be described.

First, the case where the transmission of the second message and the reception of the second message response are performed after receiving the first message will be described.

As illustrated in FIG. 12, in step S10, the local control apparatus 330 transmits oadrRegisterReport to the power management server 200. The oadrRegisterReport includes information indicating a list of reporting functions which the local control apparatus 330 deals with.

In step S11, the power management server 200 transmits oadrRegisteredReport to the local control apparatus 330. The oadrRegisteredReport is a response to the oadrRegisterReport.

In step S12, the power management server 200 transmits oadrCreateReport to the local control apparatus 330. The oadrCreateReport is an example of a first message requesting a report of the information on the equipment.

In step S13, the local control apparatus 330 selects an information element complied with the second protocol on the basis of the information element specified by oadrCreateReport. Such selection is performed, for example, on the basis of the correspondence relationship illustrated in FIG. 11.

In step S14, the local control apparatus 330 transmits the GET command including the information element selected in step S13 to the equipment 350. The GET command is an example of the second message.

In step S15, the local control apparatus 330 receives a GET command response from the equipment 350. The GET command response is an example of the second message response.

In step S16, the local control apparatus 330 converts the information element included in the GET command response into the information element complied with the first protocol. Such conversion is performed, for example, on the basis of the correspondence relationship illustrated in FIG. 11.

In step S17, the local control apparatus 330 transmits oadrCreatedReport including the information element converted in step S16 to the power management server 200. The oadrCreatedReport is an example of the first message response.

In FIG. 12, the oadrCreateReport is exemplified as the first message requesting a report of the information on the equipment, but the embodiment is not limited thereto. The first message requesting a report of the information on the equipment may be oadrRegisteredReport.

Second, the case where the transmission of the second message and the reception of the second message response are performed before receiving the first message will be described.

As illustrated in FIG. 13, in step S20, the local control apparatus 330 transmits the oadrRegisterReport to the power management server 200. The oadrRegisterReport includes information indicating a list of reporting functions which the local control apparatus 330 deals with.

In step S21, the power management server 200 transmits oadrRegisteredReport to the local control apparatus 330. The oadrRegisteredReport is the response to oadrRegisterReport.

In step S22, the local control apparatus 330 transmits a GET command to the equipment 350. The GET command is an example of the second message.

In step S23, the local control apparatus 330 receives a GET command response from the equipment 350. The GET command response is an example of the second message response.

In step S24, the local control apparatus 330 manages the information elements included in the GET command response. Such management is performed as part of the power management of the facility 300. Accordingly, processing of steps S22 to S24 may be performed periodically.

In step S25, the power management server 200 transmits the oadrCreateReport to the local control apparatus 330. The oadrCreateReport is an example of a first message requesting a report of the information on the equipment.

In step S26, the local control apparatus 330 converts the information element managed in step S24 into an information element complied with the first protocol. Such conversion is performed, for example, on the basis of the correspondence relationship illustrated in FIG. 11.

In step S27, the local control apparatus 330 transmits the oadrCreatedReport including the information element converted in step S26 to the power management server 200. The oadrCreatedReport is an example of the first message response.

(Action and Effect)

In the embodiment, the local control apparatus 330 transmits a second message corresponding to the control content for the equipment indicated by the first message and including the information element of the second protocol corresponding to the information element of the first protocol to the equipment. According to such a configuration, even when instructing control on the equipment by a first message according to the first protocol across the first protocol and the second protocol different from each other, it is possible to appropriately control the equipment. As a result, it is possible to appropriately manage the power flow amount or the reverse power flow amount of the power grid 110.

[First Modification]

Hereinafter, a first modification of the embodiment will be described. Differences from the embodiments will be mainly described below.

In the first modification, the local control apparatus 330 includes specification information specifying an information element (hereinafter, referred to as a local control element) which the equipment is capable of dealing with according to the second protocol, and transmits the third message according to the first protocol to the power management server 200. The specification information includes information specifying whether or not the equipment deals with a local control element indicating an operation state requesting setting for the equipment. That is, the specification information includes information indicating whether or not the equipment deals with a local information element that may be included in the SET command.

The specification information may include a list of local information elements which the equipment deals with among the local information elements that may be included in the SET command. The specification information may include information (for example, information for identifying Appendix A to H of ECHONET Lite) that identifies a release of the second protocol which the equipment deals with. The specification information may include information indicating whether or not the equipment deals with a local control element defined as an option in the second protocol. Further, the specification information may include information that specifies whether or not the equipment deals with a measurable amount (for example, temperature, humidity, and the like of an air conditioner). As such, the specification information includes whether or not the equipment deals with the measurable amount, whereby it is possible to identify which release of the second protocol the equipment deals with.

(Power Management Method)

Hereinafter, the power management method according to a first modification will be described. In the following, a case will be exemplified where the first protocol is a protocol conforming to Open ADR 2.0, and the second protocol is a protocol conforming to ECHONET Lite.

As illustrated in FIG. 14, in step S30, the local control apparatus 330 transmits a GET property map command to the equipment 350. The GET property map command is a command for requesting a list of local information elements which the equipment 350 is capable of dealing with, among the local information element that can be included in the GET command.

In step S31, equipment 350 transmits a GET property map response command to the local control apparatus 330. The GET property map response command includes a list of local information elements which the equipment 350 is capable of dealing with among the local information elements that can be included in the GET command.

In step S32, the local control apparatus 330 transmits a SET property map command to the equipment 350. The SET property map command is a command for requesting a list of local information elements that the equipment 350 is capable of dealing with among local information elements that can be included in the SET command.

In step S33, the equipment 350 transmits the SET property map response command to the local control apparatus 330. The SET property map response command includes a list of local information elements that the equipment 350 is capable of dealing with among the local information elements that can be included in the SET command.

In FIG. 14, steps S30 and S32 are separate processes, but the GET property map command and the SET property map command may be included in one command. Similarly, although steps S31 and S33 are separate processes, the GET property map response command and the SET property map response command may be included in one command. The processing of steps S30 to S33 may be performed when the equipment 350 is connected to the local control apparatus 330 for the first time or again or may be performed when the equipment 350 recovers from a power failure.

In step S34, the local control apparatus 330 transmits oadrRegisterReport to the power management server 200. As described above, the oadrRegisterReport includes information indicating a list of reporting functions which the local control apparatus 330 deals with (that is, a list of local information elements that the equipment 350 is capable of dealing with among local information elements that can be included in the GET command).

Here, the oadrRegisterReport includes specification information indicating whether or not the equipment deals with the local information element that can be included in the SET command Therefore, oadrRegisterReport is an example of the third message. However, the first modification is not limited to thereto. The third message may be a message defined separately from oadrRegisterReport.

The specification information may include a list of local information elements the equipment deals with among the local information elements that can be included in the SET command. Such a list is obtained in step S33. The specification information may include information identifying a release of the second protocol which the equipment deals with. The information for identifying the release is specified by the local control apparatus 330, for example, on the basis of the list acquired in step S33. The specification information may include information indicating whether or not the equipment deals with a local control element defined as an option in the second protocol. Such information is specified by the local control apparatus 330 on the basis of, for example, the list acquired in step S33.

In step S35, the power management server 200 transmits oadrRegisteredReport to the local control apparatus 330. The oadrRegisteredReport is a response to oadrRegisterReport.

(Action and Effect)

In the first modification, the local control apparatus 330 transmits a third message including specification information specifying a local control element which the equipment is capable of dealing with according to the second protocol to the power management server 200. According to such a configuration, the power management server 200 can grasp the local control element that the equipment is capable of dealing with according to the second protocol used in the facility 300. Accordingly, the power management server 200 can transmit an appropriate first message on the basis of such a local control element. As a result, it is possible to appropriately manage the power flow amount or the reverse power flow amount of the power grid 110.

[Second Modification]

A second modification of the embodiment will be described below. Differences from the embodiments will be mainly described below.

In the second modification, a power management server 200 transmits a first message in a manner capable of identifying a control for the local control apparatus 330 and a control for a target equipment which is an equipment designated by the power management server 200.

Here, the manner capable of identifying may be realized by the first message including a flag indicating whether the control is for the local control apparatus 330 or for the target equipment. Whether the control is for the local control apparatus 330 or the target equipment may be mapped to an information element specified by the first message. For example, if the information element specified by the first message relates to "HISTORY_USAGE," it may mean that the first message relates to control to the local control apparatus 330. If the information element specified by the first message is related to "TELEMETRY_USAGE," it may mean that the first message relates to control on the target equipment. If the information element specified by the first message relates to "SIMPLE" or "ELECTRICITY_PRICE," it may mean that the first message relates to control to the local control apparatus 330. If the information element specified by the first message relates to "CHARGE_S-TATE," it may mean that the first message relates to control for the target equipment.

(1) A Case where the First Message is an Instruction to Request Setting of an Operation State of the Target Equipment In such a case, the local control apparatus 330 selects one or more local information elements corresponding to the information elements complied with the first message from the local information elements which the target equipment is capable of dealing with according to the second protocol. The local control apparatus 330 transmits to the target equipment a message including the selected local information element as an information element as a second message.

Here, as illustrated in FIG. 11, a correspondence relationship between the local information element which the target equipment is capable of dealing with and the information element complied with the first message may be managed by the local control apparatus 330. In FIG. 11, the correspondence relationship relating to the report of the information on the equipment are exemplified, but a correspondence relationship related to operation state setting of the equipment can also be managed in the same manner as in FIG. 11.

(2) A Case in which the First Message is an Instruction Requesting Control of the Power Flow or the Reverse Power Flow In such a case, the local control apparatus 330 selects one or more local information elements that realize the control of the power flow or the reverse power flow instructed by the first message from the local information elements which the target equipment is capable of dealing with according to the second protocol. The local control apparatus 330 transmits to the target equipment a message including the selected local information element as an information element as a second message.

Here, the local control apparatus 330 may determine a method of realizing the control of the power flow or the reverse power flow indicated by the first message according to the power situation of the facility 300. In such a determination, the local control apparatus 330 may consider user settings (energy saving settings).

(3) A Case where the First Message is an Instruction to Request Reporting of the Information on the Target Equipment In such a case, the local control apparatus 330 may determine whether or not to inquire the target equipment about the information on the target equipment. For example, as described above, the local control apparatus 330 may determine whether to inquire the target equipment for information on the target equipment on the basis of a flag indicating whether the control is for the local control apparatus 330 or for the target equipment. Alternatively, the local control apparatus 330 may determine whether to inquire the target equipment for information on the target equipment according to the type of information of the target equipment. In such a case, if the information element specified by the first message is related to "TELEMETRY_USAGE", the local control apparatus 330 may determine to inquire the target equipment about the information on the target equipment according to the type of information on the target equipment. On the other hand, if the information element specified by the first message relates to "HISTORY_US-AGE", the local control apparatus 330 may determine not to inquire the target equipment about the information on the target equipment.

When it is determined to inquire the target equipment about the information on the target equipment, the local control apparatus 330 selects one or more local information elements corresponding to the information element complied with the first message from the local information elements which the target equipment is capable of dealing with according to the second protocol. The local control apparatus 330 transmits the second message including the selected local information element to the target equipment. The local control apparatus 330 transmits to the power management server 200 a first message response including the information element based on the information of the target equipment acquired from the target equipment by the transmission of the second message. Such processing is similar to the processing of steps S13 to S15 illustrated in FIG. 12.

When it is determined not to inquire the target equipment about the information on the target equipment, the local control apparatus 330 transmits a first message response including an information element based on the information on the target equipment managed by the local control apparatus 330 to the power management server 200. Such processing is the same as the processing from step S26 to step S27 illustrated in FIG. 13.

(Power Management Method)

Hereinafter, a power management method according to the second modification will be described. In the following, a case will be exemplified where the first protocol is a protocol conforming to Open ADR 2.0 and the second protocol is a protocol conforming to ECHONET Lite. Further, a sequence relating to reporting information on the equipment will be described.

As illustrated in FIG. 15, in step S40, the local control apparatus 330 transmits a GET command to the equipment 350. The GET command is an example of the second message.

In step S41, the local control apparatus 330 receives a GET command response from the equipment 350. The GET command response is an example of the second message response.

In step S42, the local control apparatus 330 manages the information elements included in the GET command response. Such management is performed as part of the power management of the facility 300. Therefore, the processing of steps S40 to S41 may be performed periodically.

In step S43, the power management server 200 transmits oadrCreateReport to the local control apparatus 330. The oadrCreateReport is an example of a first message requesting a report of the information on the equipment.

In step S44, the local control apparatus 330 determines whether to inquire the target equipment for information on the target equipment. If it is determined to inquire the target equipment about the information on the target equipment, the processing in steps S45 and S46 is performed. When it is determined not to inquire the target equipment about the information on target equipment, the processes of step S45 and step S46 are not performed and the process of step S47 is performed.

In step S45, the local control apparatus 330 selects an information element complied with the second protocol on the basis of the information element specified by oadrCreateReport, and transmits a GET command including the selected information element to the equipment 350. The GET command is an example of the second message.

In step S46, the local control apparatus 330 receives a GET command response from the equipment 350. The GET command response is an example of the second message response.

In step S47, the local control apparatus 330 converts the information element included in the GET command response into the information element complied with the first protocol. Such conversion is performed, for example, on the basis of the correspondence relationship illustrated in FIG. 11.

Here, when it is determined to inquire the target equipment about the information on the target equipment, the information element included in the GET response command received in step S46 is used. When it is determined not to inquire the target equipment about the information on the target equipment, the information element managed by the local control apparatus 330 (the information element included in the GET response command received in step S41) is used.

In step S48, the local control apparatus 330 transmits the oadrCreatedReport including the information element converted in step S47 to the power management server 200. The oadrCreatedReport is an example of the first message response.

(Action and Effect)

In the second modification, the power management server 200 transmits the first message in a manner capable of identifying the control for the local control apparatus 330 and the control for the target equipment. According to such a configuration, the control on the local control apparatus 330 and the control on the target equipment are used appropriately, whereby it is possible to appropriately manage the power flow amount or the reverse power flow amount of the power grid 110.

[Third Modification]

A third modification of the embodiment will be described below. In the following, differences from the embodiments will be mainly described.

In the third modification, the power management server 200 determines to instruct which one of the control for the local control apparatus 330 and the control for the target equipment. Specifically, on the basis of at least one of an execution time length during which the control of power flow or the reverse power flow is performed or a waiting time length until a timing at which the control of the power flow or the reverse power flow is performed, the power management server 200 determines to instruct which one of the control for the local control apparatus 330 and the control for the target equipment. The execution time length may be specified by the information element (xcal: duration) included in the first message. The waiting time length may be specified by the information element (xcal: dstart) included in the first message.

For example, the power management server 200 may determine to instruct the control for the local control apparatus 330 when the execution time length is longer than a predetermined time. Since the execution time length is long, quality of life (QOL) of the facility 300 may be prioritized over an effectiveness of the power supply and demand adjustment by the first message. On the other hand, when the execution time length is shorter than the predetermined time, the power management server 200 may determine to instruct the control for the target equipment. Since the execution time length is short, the effectiveness of the power supply and demand adjustment by the first message may be prioritized over the QOL of the facility 300. However, the third modification is not limited thereto, and a determination different from the aforementioned determination may be made.

When the waiting time length is longer than the predetermined time, the power management server 200 may determine to instruct the control for the local control apparatus 330. This is to secure a time for the local control apparatus 330 to plan the power supply and demand adjustment because the waiting time length is long. On the other hand, the power management server 200 may determine to instruct the control for the target equipment in the case where the waiting time length is shorter than a predetermined time. This is to ensure immediacy of power supply and demand adjustment by the first message because the waiting time length is short. However, the third modification is not limited thereto, and a determination different from the aforementioned determination may be made.

(Power Management Method)

Hereinafter, a power management method according to the second modification will be described. In the following, a case will be exemplified where the first protocol is a protocol conforming to Open ADR 2.0, and the second protocol is a protocol conforming to ECHONET Lite. Further, a sequence relating to the control of the power flow or the reverse power flow will be described.

As illustrated in FIG. 16, in step S50, the power management server 200 determines to instruct which one of the control for the local control apparatus 330 and the control for the target equipment. Such a determination may be made on the basis of at least one of the execution time length and the waiting time length.

In step S51, the power management server 200 transmits the oadr DistributeEvent to the local control apparatus 330 on the basis of the determination in step S50. The oadrDistributeEvent is an example of a first message requesting control of the power flow or the reverse power flow. The oadrDistributeEvent is transmitted in a manner capable of identifying the control for the local control apparatus 330 and the control for the target equipment, as in the second modification.

In step S52, the local control apparatus 330 selects one or more local information elements that realize the control of the power flow or the reverse power flow instructed by the oadrDistributeEvent among the local information elements which the target equipment is capable of dealing with according to the second protocol.

Here, in the case where the oadrDistributeEvent is a message instructing the control for the local control apparatus 330, the local control apparatus 330 realizes the control of the power flow or the reverse power flow by transmitting the SET command for an arbitrary equipment on the basis of a power situation of the facility 300. On the other hand, in the case where the oadrDistributeEvent is a message instructing the control for the target equipment, the local control apparatus 330 realizes the control of the power flow or the reverse power flow by transmitting the SET command for the target equipment.

In step S53, the local control apparatus 330 transmits the SET command including the local information element selected in step S52 to the equipment 350. The SET command is an example of the second message.

In step S54, the local control apparatus 330 transmits a SET response command for the SET command to the equipment 350. The SET response command is an example of the second message response.

In step S55, the local control apparatus 330 transmits oadrCreatedEvent to the power management server 200. The oadrCreatedEvent is a response to the oadrDistributeEvent. The oadrCreatedEvent may be transmitted before step S52.

(Action and Effect)

In the third modification, the power management server 200 determines to instruct which one of the control for the local control apparatus 330 or the control for the target equipment on the basis of at least one of the execution time length and the waiting time length. According to such a configuration, it is possible to appropriately use the control for the local control apparatus 330 and the control for the target equipment.

Other Embodiments

Although the present invention has been described with reference to the aforementioned embodiments, it should not be understood that the description and drawings constituting a part of this disclosure limit the present invention. From this disclosure, various alternative embodiments, examples and operational techniques will be apparent to those skilled in the art.

In the embodiment, the case where the first protocol is a protocol conforming to Open ADR 2.0, and the second protocol is a protocol conforming to ECHONET Lite has been exemplified. However, the embodiment is not limited thereto. The first protocol may be a protocol standardized as a protocol used for communication between the power management server 200 and the local control apparatus 330. The second protocol may be a protocol standardized as a protocol used in the facility 300.

In the embodiment, the case where the information element managed by the local control apparatus 330 is an information element included in the GET response command has been exemplified. However, the embodiment is not limited thereto. The information element managed by the local control apparatus 330 may be an information element included in the INF command.

The entire contents of Japanese Patent Application No. 2016-212996 (filed on Oct. 31, 2016) is incorporated herein by reference.

REFERENCE SIGNS LIST

100: power management system, 110: power grid, 120: network, 200: power management server, 210: management unit, 220: communication unit, 230: controller, 300: facility, 310: load, 320: distributed power supply, 330: local control apparatus, 331: first communication unit, 332: second communication unit, 333: controller, 350: equipment

The invention claimed is:

1. A power management method comprising:
    transmitting a first message for instructing a control from a power management server to a local control apparatus according to a first protocol, the power management server managing a facility connected to a power grid, the local control apparatus provided in the facility, wherein the first protocol defines information element used for communication between the power management server and the local control apparatus;
    transmitting a second message for performing the control from the local control apparatus to equipment provided in the facility according to a second protocol different from the first protocol, wherein the second protocol defines information element used for communication between the local control apparatus and the equipment; and
    transmitting a third message from the local control apparatus to the power management server according to the first protocol, the third message including specification information specifying a local control element which the equipment is capable of dealing with according to the second protocol among local control elements defined in the second protocol,
    wherein the local control elements include a further local control element indicating an operation state requesting setting for the equipment.

2. The power management method according to claim 1, comprising:
    receiving by the local control apparatus from the equipment, a command including a list of local control elements which the equipment is capable of dealing with according to the second protocol,
    wherein the specification information includes the list of local control elements which the equipment is capable of dealing with according to the second protocol.

3. The power management method according to claim 1, comprising:
    receiving by the local control apparatus from the equipment, a command including a list of local control elements which the equipment is capable of dealing with according to the second protocol,
    wherein the specification information includes information identifying a release of the second protocol which the equipment deals with.

4. The power management method according to claim 1, comprising:
    receiving by the local control apparatus from the equipment, a command including a list of local control elements which the equipment is capable of dealing with according to the second protocol,
    wherein the specification information includes information indicating whether or not the equipment deals with a local control element defined as an option in the second protocol.

5. A local control apparatus comprising:
    a receiver configured to receive a first message for instructing a control from a power management server according to a first protocol, the power management server managing a facility connected to a power grid, wherein the first protocol defines information element used for communication between the power management server and the local control apparatus; and
    a transmitter configured to transmit a second message for performing the control to equipment according to a second protocol different from the first protocol, the equipment provided in the facility, wherein the second protocol defines information element used for communication between the local control apparatus and the equipment,
    wherein the transmitter is configured to transmit a third message to the power management server according to the first protocol, the third message including specification information specifying a local control element which the equipment is capable of dealing with according to the second protocol among local control elements defined in the second protocol, and the local control elements include a further local control element indicating an operation state requesting setting for the equipment.

6. A power management system comprising:

a power management server configured to manage a facility connected to a power grid; and a local control apparatus provided in the facility, wherein the power management server includes a first transmitter configured to transmit a first message for instructing a control to the local control apparatus according to a first protocol, wherein the first protocol defines information element used for communication between the power management server and the local control apparatus, the local control apparatus includes a second transmitter configured to transmit a second message for performing the control to equipment provided in the facility according to a second protocol different from the first protocol, wherein the second protocol defines information element used for communication between the local control apparatus and the equipment, the second transmitter is configured to transmit a third message to the power management server according to the first protocol, the third message including specification information specifying a local control element which the equipment is capable of dealing with according to the second protocol among local control elements defined in the second protocol, and the local control elements include a further local control element indicating an operation state requesting setting for the equipment.

7. The power management method according to claim 1, wherein the first protocol is a protocol conforming to Open Automated Demand Response (ADR) or an independent dedicated protocol, and the second protocol is a protocol conforming to ECHONET Lite, Smart Energy Profile (SEP) 2.0, KNX, or an independent dedicated protocol.

\* \* \* \* \*